Sept. 7, 1965
H. WELLER
3,204,857
COMPRESSED-AIR SUPPLY SYSTEM
Filed Oct. 30, 1962
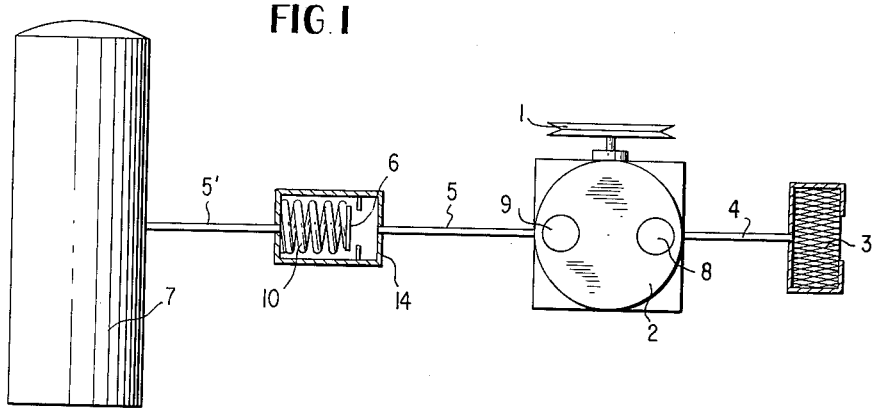
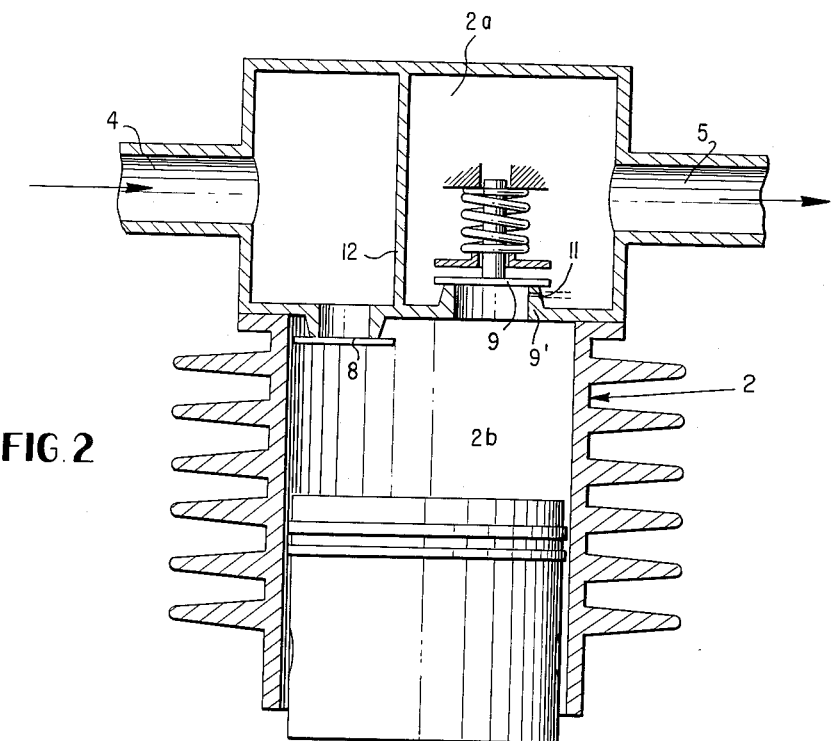
INVENTOR.
HELMUT WELLER
BY Dicke & Craig
ATTORNEYS

3,204,857
COMPRESSED-AIR SUPPLY SYSTEM
Helmut Weller, Waldenbuch, Germany, assignor to Daimler-Benz Aktiengesellschaft, Stuttgart-Unterturkheim, Germany
Filed Oct. 30, 1962, Ser. No. 234,018
Claims priority, application Germany, Nov. 9, 1961, D 37,421
2 Claims. (Cl. 230—22)

The present invention relates to a compressed-air storage system, and more particularly to an installation for producing and maintaining a compressed air supply, especially in motor vehicles, even after the engine comes to a standstill.

For producing and maintaining a predetermined compressed air supply, for example, for pneumatically operating brakes, pneumatic springs or starter installations in motor vehicles, the air is normally supplied from an air compressor by way of a check valve to the air storage tank. Since the closure spring of the check valve, on the one hand, has to be relatively weak for reasons of noise, and, on the other, when the air compressor is turned off the valve is loaded on both sides practically by the same pressure, it follows that the valve provides an insufficient sealing with the consequence that only a relatively slight pressure differential will occur between the front and rear sides of the valve which causes continuously a flow or discharge of air from the storage tank by way of the check valve, the outlet valve of the air compressor to the compressor space thereof, and from the compressor space by way of the slits in the piston rings into the crank housing and from the bearing places thereof into the atmosphere.

The present invention obviates the aforementioned shortcomings by an intentional place of leakage of predetermined magnitude which is provided between the air compressor and check valve, especially at the pressure space of the air compressor.

As a result of the existence of the intentional leakage place in accordance with the present invention, the pressure decrease in front of the check valve, when turning off the air compression, becomes rapidly so large that the pressure behind the valve on the side of the compressed air storage or supply, together with the valve spring, closes the valve immediately and unobjectionably in a completely satisfactory and tight-sealing manner.

Accordingly, it is an object of the present invention to provide a compressed air supply system which eliminates the shortcomings and inadequacies of the prior art constructions mentioned hereinabove.

It is another object of the present invention to provide a compressed air supply system in which, after turning off the air compressor, the check valve is able to maintain a tight seal for the compressed air stored in the air-tank notwithstanding the relatively weak spring characteristics of the closure spring thereof.

Still a further object of the present invention resides in the provision of a compressed air supply system in which, after turning off the air compressor, a pressure decrease is assured in front of the check valve of such magnitude as assures an almost instantaneous and tight closure of the check valve by the combined effect of the continued existence of compressed air in the tank and the force exerted by the closure spring.

These and other objects, features and advantages of the present invention will become more obvious from the following description when taken in connection with the accompanying drawing which shows, for purposes of illustration only, one embodiment in accordance with the present invention, and wherein FIGURE 1 is a schematic illustration of the overall compressed air supply system in accordance with the present invention, and FIGURE 2 is an axial cross sectional view showing schematically an air compressor cylinder in accordance with the present invention.

Referring now to the drawing wherein like reference numerals are used throughout the two views to designate like parts, and more particularly to FIGURE 1, the air compressor 2, driven from the engine, for example, by a belt drive pulley 1, draws in fresh air through a filter 3 by way of a line 4 and supplies this air through lines 5 and 5' by way of a check valve 6 to an air supply tank 7. The inlet valve of the air compressor 2 is designated by reference numeral 8 and the outlet valve thereof by reference numeral 9. As shown in FIGURE 2, the outlet valve connects working space 2b and pressure space 2a of the air compressor. The return spring for the check valve 6 is designated by reference numeral 10.

According to the present invention, a very fine air outlet bore or aperture 11 (FIG. 2) is provided at the valve seat 9' of the outlet valve body 9.

However, the arrangement of the leakage place at the outlet valve seat 9' offers the advantage that the bore or notch is always blown out forcefully during the pressure stroke of the air compressor and therefore remains clean at all times. Additionally, this arrangement entails the advantage that no air already supplied by the air compressor is lost which is more dry by reason of the half-closed circulatory system than the fresh air sucked in through line 4. The air flowing back through the bore 11 at the outlet valve 9 reaches again the working space 2b of the air compressor.

The air overflow or discharge cross section in accordance with the present invention preferably amounts to approximately one to three tenths of a millimeter.

While I have shown and described several possibilities in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. In an installation for producing and maintaining a supply of compressed air, especially in motor vehicles, which includes an air compressor supplying compressed air by way of a check valve to a storage tank, said air compressor including a working space and a pressure space, fluid line means connecting said pressure space and said check valve, and outlet valve means connecting said pressure space and said working space, said outlet valve means comprising a stationary part,
    leakage means communicating with said pressure space and said working space,
    said leakage means comprising an aperture in said stationary part, said aperture connecting said working space and said pressure space, said outlet valve means comprising a valve seat, said valve seat being comprised by said stationary part.

2. An installation according to claim 1, wherein the cross-sectional area of said aperture is about 0.1 to 0.3 millimeter.

References Cited by the Examiner

UNITED STATES PATENTS

| | | | |
|---|---|---|---|
| 2,057,624 | 10/36 | Burckhardt | 103—41 |
| 2,083,740 | 6/37 | Paullin | 230—24 |
| 2,520,674 | 8/50 | Buschmann | 230—22 |
| 2,687,696 | 8/54 | Theis | 103—150 |
| 3,096,927 | 7/63 | Wahl | 230—30 |

FOREIGN PATENTS

| | | |
|---|---|---|
| 888,452 | 9/43 | France. |
| 690,297 | 4/40 | Germany. |
| 801,282 | 12/50 | Germany. |
| 464,996 | 8/51 | Italy. |

LAURENCE V. EFNER, *Primary Examiner.*